(12) United States Patent　　　(10) Patent No.: US 7,460,687 B2
Yokoyama　　　(45) Date of Patent: Dec. 2, 2008

(54) WATERMARKING SCHEME FOR DIGITAL VIDEO

(75) Inventor: Taro Yokoyama, Asaka (JP)

(73) Assignee: Honda Motor Co., Ltd., Minato-Ku Tokyo (JP)

( * ) Notice: Subject to any disclaimer, the term of this patent is extended or adjusted under 35 U.S.C. 154(b) by 937 days.

(21) Appl. No.: 10/616,288

(22) Filed: Jul. 10, 2003

(65) Prior Publication Data

US 2004/0101192 A1　May 27, 2004

(51) Int. Cl.
G06K 9/00　(2006.01)
(52) U.S. Cl. .................. 382/103; 382/106; 382/153; 382/154
(58) Field of Classification Search .................. 382/103, 382/106, 153, 154
See application file for complete search history.

(56) References Cited

U.S. PATENT DOCUMENTS 5,499,306 A * 3/1996 Sasaki et al. ................ 382/291
6,385,331 B2 * 5/2002 Harakawa et al. ........... 382/106
6,553,281 B1 * 4/2003 Liu ............................. 700/302

FOREIGN PATENT DOCUMENTS

EP　1 059 608 A2　12/2000
JP　2001-56861　2/2001
WO　WO 01/69365　9/2001

OTHER PUBLICATIONS

Watanabe, et al. "Estimation of Pointing Gestures Using Multiple Cameras", IEE, Conference Material, Japan, the Institute of Electrical Engineers of Japan, Dec. 2000, IP-00-7, pp. 37-42.*
The Transactions of Electronics, Information, and Systems (IEE of Japan), vol. 121-C, No. 9, 2001, "Detection of Omni-Directional Pointing Gestures", pp. 1388-1394.
The Transactions of Electronics, Information, and Systems (IEE of Japan), vol. 121-C, No. 9, 2001, "An Interactive Hand Pointer that Projects a Mark in the Real Work Space", pp. 1464-1470.

* cited by examiner

Primary Examiner—Matthew C. Bella
Assistant Examiner—Wes Tucker
(74) Attorney, Agent, or Firm—Squire, Sanders & Dempsey, L.L.P.

(57) ABSTRACT

A pointing position detection device is provided which, along with enabling a human being to perform pointing operation in a natural manner, can perform detection at high accuracy. The device detects the presence of a human being from an image photographed by cameras and a position at which the human being is pointing, and which includes: a section which, based upon the image, detects a head position of the human being, including at least distance information; a section which, based upon tile image, detects a hand position of the human being, including at least distance information; a section which, based upon the hand position, calculates a hand tip position and a main axis of the hand; and a section which detects a pointing direction, based upon the head position, the hand tip position, and the main axis, wherein the pointing position is detected based upon the pointing direction.

8 Claims, 11 Drawing Sheets

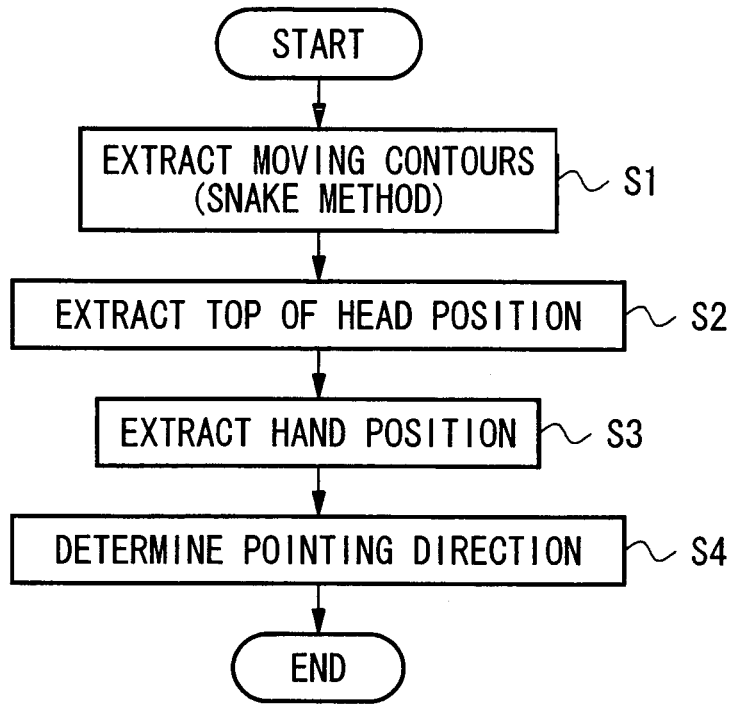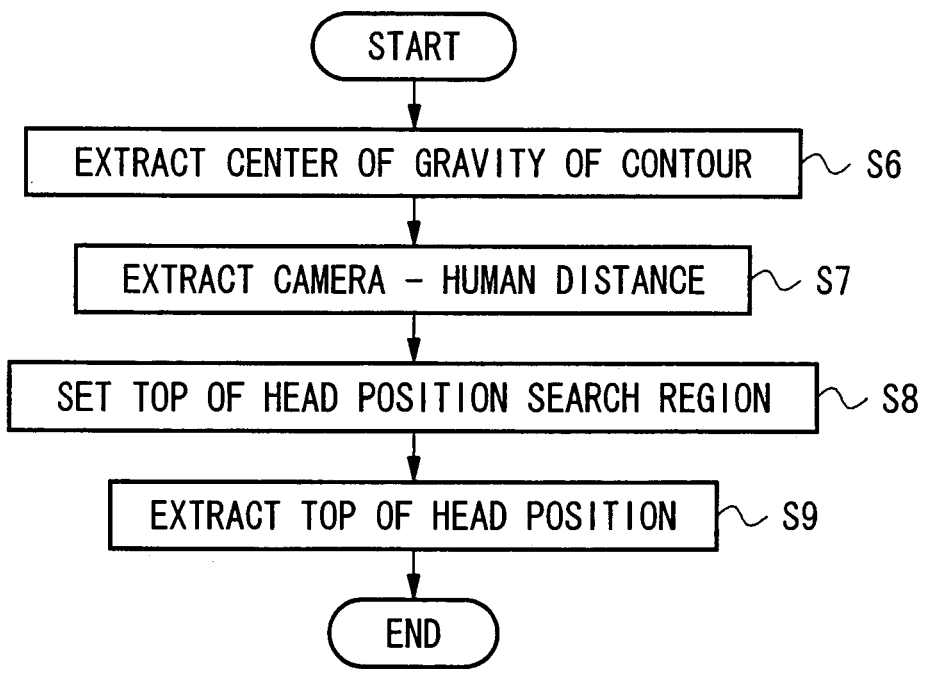

WATERMARKING SCHEME FOR DIGITAL VIDEO

BACKGROUND OF THE INVENTION

1. Field of the Invention

The present invention relates to a pointing position detection device and to an autonomous robot, which detect a pointing position which a human being is exhibiting by recognizing the attitude of the human being based upon an image.

2. Description of the Related Art

In the conventional art, there has been a known type of autonomous robot which, by performing speech recognition, initiates certain behavior upon recognition of an indication provided to it in the form of a speech indication which is generated by a human being. This kind of autonomous robot has the distinctive feature that, if an indication is to be provided to it, the autonomous robot is able to receive an indication without the person who is providing the indication needing to utilize any special device.

However, such a system is subject to the problem that it is not possible to transfer an indication accurately, since, with an indication system which employs speech, the speech recognition ratio is deteriorated in areas in which the noise level is high. Furthermore, it is necessary to register the speech pattern of the human being who is generating the speech in advance in order to enhance the speech recognition ratio, and there is no way of being able to provide such an indication by recognizing the speech of an arbitrary person.

In order to solve this type of problem, a method has been tried of recognizing the attitude of the body of a human being based upon image information, and of recognizing the indication which is meant by this attitude. For example, there is a known pointing gesture direction inferring method which has been described in The Transactions of Electronics, Information, and Systems (IEE of Japan), Vol. 121-C (2001.9), p. 1388-p. 1394, "Detection of Omni-Directional Pointing Gestures" (hereinafter referred to as "Related Art 1"). With this method, first the human being is photographed with a plurality of cameras, and a region corresponding to his face is extracted from the image which has been obtained, and then his full face is detected based upon the results of inferring the direction of his face, and also the position of his eye is specified. Next, a hand region is extracted from the image which has been obtained, and the end portion of this region is specified as being the position of his finger tip. In addition, the spatial positions of his eye and his finger tip which have thus been derived are obtained, and the pointing direction is inferred as being along the extended straight line which joins these two positions. Furthermore, there is a known interactive hand pointer method which has been described in The Transactions of Electronicsee, Information, and Systems (IEE of Japan), Vol. 121-C (2001.9), p. 1464-p. 1470, "An Interactive Hand Pointer that Projects a Mark in the Real Work Space" (hereinafter referred to as "Related Art 2"). With this method, the hand of a human being which is making an indication is photographed against a simple background by a camera and the position of the finger tip is obtained by block matching between the image which has been obtained and template images of a finger tip which have been prepared in advance, and the straight line which joins from the central position of a base of the finger which is within a specific region to this position is taken as being the pointing direction.

According to these methods, an object in the direction which is being pointed by the finger tip of a human being who is giving an indication is recognized, and this can be employed as a human-robot interface in order to cause the robot to start a subsequent operation or the like.

Moreover, Japanese Unexamined Patent Application, First Publication No. 2001-56861 and the corresponding European Patent Application, First Publication No. EP 1 059 608 A2 (hereinafter referred to as "Related Art 3") disclose recognition of the shape and attitude of a hand.

However with a method, as in Related Art 1, of giving a pointed position by taking the extension of a hypothetical straight line joining the head and the hand tip, since the deviation of the detected position becomes great according to increase of the distance to the object which is pointed, there is the problem that it is necessary to implement a special pointing method in order to make this deviation small. Furthermore, since with this method the point furthest from the center of gravity position of the hand region which has been extracted from the image is taken as the position of the tip of the finger, there is the problem that, if the arm of the person is bent, a position which is completely different from may be recognized as being the one which is being pointed.

Furthermore with a method, as in Related Art 2, of detecting a finger tip and the direction in which it is pointing against a simple background, along with it being necessary for the background to be already known, there is the problem that there are also limitations upon the position in which the camera can be located. Yet further, there is the problem with this method that the range for detection is narrow, so that the deviation becomes great for a pointing position other than one which is located at a relatively close distance.

Related Art 3 requires three or more cameras. In addition, it is difficult to apply Related Art 3 to a situation in which the relative location between a robot (cameras) and a human being changes over time. Additionally, Related Art 3 merely detects the direction of the hand tip, so that it cannot determine with high accuracy a position at which a human being is pointing.

SUMMARY OF THE INVENTION

The present invention has been conceived in the light of this type of circumstance, and it takes as its objective to provide a pointing position detection device which makes it possible for a human being to perform pointing operation in a natural manner and also to perform pointing position detection at high accuracy, and also to provide an autonomous robot which initiates behavior based upon the results of pointing position which have been thus detected.

A pointing position detection device according to the present invention is a device which detects the presence of a human being from an image which is photographed by a plurality of cameras, and which detects a position at which the human being is pointing, comprising: a section which detects a head position of the human being, including at least distance information, based upon the image; a section which detects a hand position of the human being, including at least distance information, based upon the image; a section which calculates a position of a hand tip and a main axis of the hand, based upon the hand position which has been detected; and a section which detects a direction in which the human being is pointing, based upon the head position which has been detected and the position of the hand tip and the main axis of the hand which have been calculated, wherein the position at which the human being is pointing is detected, based upon the detected direction in which the human being is pointing.

According to this structure, along with detecting the main axis of the hand and the hand tip position from the position of the hand including distance information, also the position of the head of the human being, including distance information, is detected, and, based upon the head position, the hand tip position, and the main axis of the hand which have been detected, the direction in which the human being is pointing is detected, and the position which is being pointed is detected from this direction. Therefore, it is possible to detect the position which is being pointed at high accuracy. Furthermore, since it is arranged for the position which is being pointed to be detected based upon the main axis of the hand, thereby it becomes possible to detect the position which is being pointed with high accuracy, even if the arm is bent. Yet further, it is possible to perform detection without any limitation being imposed upon the position in which the camera is disposed during detection, or upon the background, since the position which is being pointed is detected based upon its position which includes distance information.

The present invention may further comprise a section which calculates a position of an eye, based upon the head position which has been detected, and the section for detecting the direction in which the human being is pointing may detect the direction in which the human being is pointing, based upon the position of the eye, the position of the hand tip, and the main axis of the hand.

According to this structure, it is possible to detect the position at which the human being is pointing with even better accuracy, since the direction in which the human being is pointing is detected based upon the position of his eye, the position of his hand tip, and the main axis of his hand.

In the present invention, the section for detecting the hand position may further comprise a section which sets a predetermined search region within the image, based upon the position of the hand.

According to this structure, it is possible to enhance the speed of detection of the position of the hand tip and of the main axis of the hand, since it is arranged to set the predetermined search region within the image based upon the position of the hand.

In the present invention, the main axis of the hand may be detected, based upon the distribution of picture element data which make up the image of the hand present within the search region.

According to this structure, it is possible to detect the main axis of the hand only by calculation without using a complex process, since it is arranged to detect the main axis of the hand based upon the distribution of the picture element data which make up the image of the hand present within the search region.

In the present invention, the position at which the human being is pointing may be detected by calculating the intersection of the direction in which the human being is pointing and a predetermined object which is present within the image.

According to this structure, it is possible to detect the position by a simple calculation even when the floor or a wall or the like has been pointed, since it is arranged to detect the position which is being pointed by calculating the intersection of the direction which it has been detected that the human being is pointing, and a predetermined object which is present within the image.

An autonomous robot according to the present invention comprises the above-described pointing position detection device.

According to this structure, it is possible to implement an advanced human robot interface, since a pointing position detection device which is capable of detecting the position of the pointing with high accuracy is provided in the autonomous robot.

BRIEF DESCRIPTION OF THE DRAWINGS

FIG. 2 is a flow chart showing the operation of a pointing position detection section 2 shown in FIG. 1.

FIG. 3 is another flow chart showing the operation of the pointing position detection section 2 shown in FIG. 1.

DETAILED DESCRIPTION OF THE PREFERRED EMBODIMENTS

Figure 1:
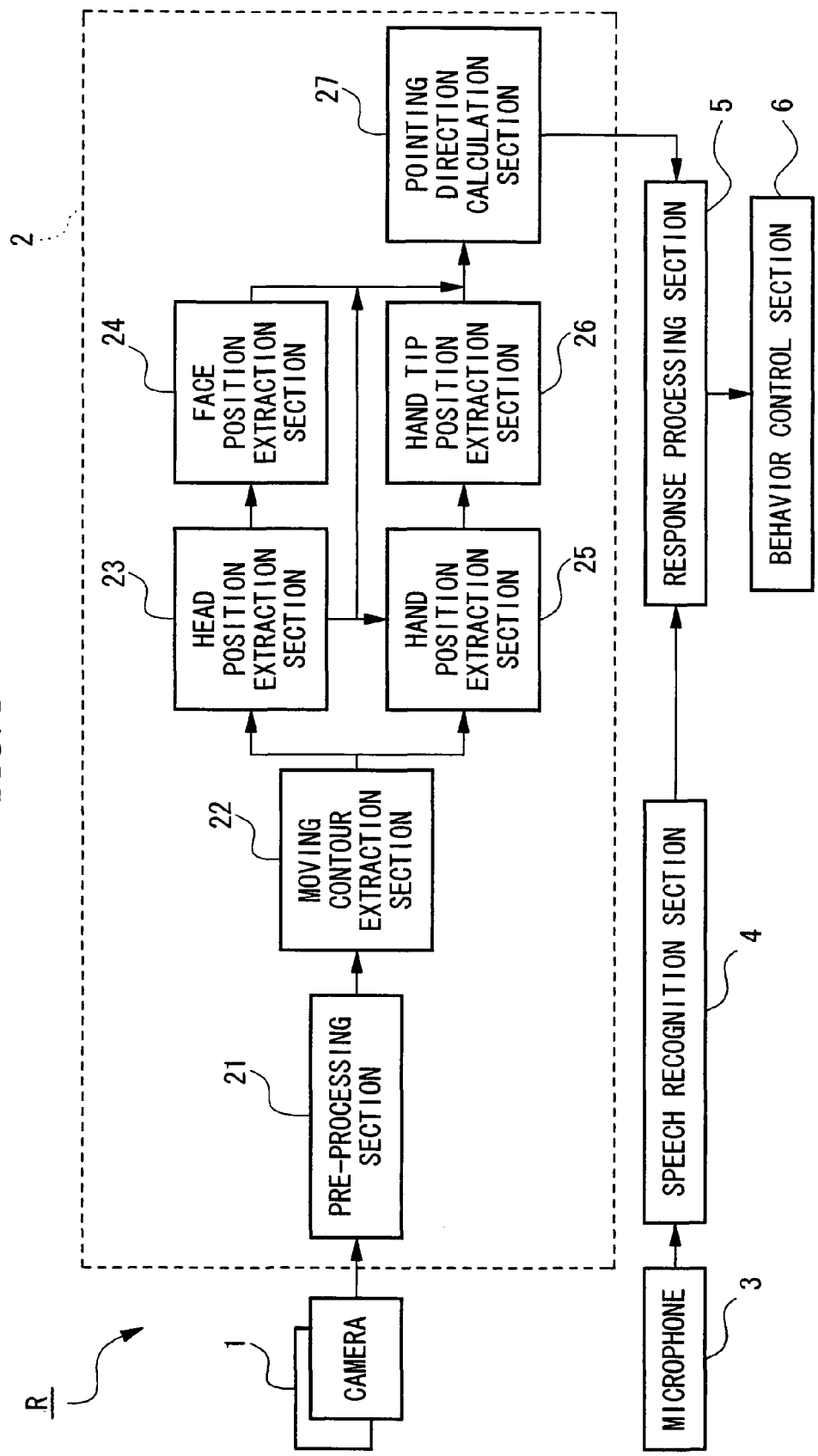
FIG. 1 is a block diagram showing the structure of a preferred embodiment of the present invention.

In the following, the pointing position detection devices and the autonomous robots according to the preferred embodiments of the present invention will be explained with reference to the drawings. FIG. 1 is a block diagram showing the structure of a preferred embodiment. The reference symbol 1 denotes a stereo camera (hereinafter simply termed a camera) which employs two color CCDs. The reference symbol 2 denotes a pointing position detection section which recognizes a pointing position being pointed by a human being based upon images which have been obtained by the camera 1. The reference symbol 3 denotes a microphone which captures speech which is emitted by a human being. The reference symbol 4 denotes a speech recognition section which recognizes this speech which has been captured by the microphone 3. The reference symbol 5 denotes a response processing section which, based upon the results of pointing position detection by the pointing position detection section 2, performs processing for initiating its (the autonomous robot's) own movement. The reference symbol 6 denotes a behavior control section which, based upon the output of the response processing section 5, controls the operation (the movement of the legs, the head, the arms and so on) of the autonomous robot.

The reference symbol 21 denotes a pre-processing section which performs pre-processing for simplifying the subsequent processing of the images which have been captured by the camera 1, and, based upon two images which have been captured by the camera 1, it performs processing for obtaining a distance image (an image which includes depth information), and processing for performing extraction of edges and extraction of skin colored regions from either one of the images which is obtained from the camera 1. The reference symbol 22 denotes a moving contour extraction section which extracts, from the images which have thus been pre-processed, moving objects which are in motion. The reference symbol 23 denotes a head position extraction section which, based upon the results of contour extraction from this moving contour extraction section 22, extracts a head position (the position of the upper extremity of a head portion) of a human being. The reference symbol 24 is a face position extraction section which, based upon the results of head position extraction obtained from the head position extraction section 23, extracts a face position of the human being. The reference symbol 25 denotes a hand position extraction section which, based upon the results of contour extraction obtained from the moving contour extraction section 22 and upon the results of head position extraction obtained from the head position extraction section 23, extracts the position of a hand of the human being (including his palm and his arm). The reference symbol 26 denotes a hand tip position extraction section which, based upon the results of hand position extraction obtained from the hand position extraction section 25, extracts a hand tip position for the human being. And the reference symbol 27 denotes a pointing direction calculation section which, based upon the results outputted by each of the head position extraction section 23, the face position extraction section 24, the hand position extraction section 25, and the hand tip position extraction section 26, recognizes the pointing direction which is being made by the human being. This pointing direction calculation section 27 detects the direction in which the human being is pointing based upon these processing results which have been obtained, and outputs this direction to the response processing section 5.

Figure 14:
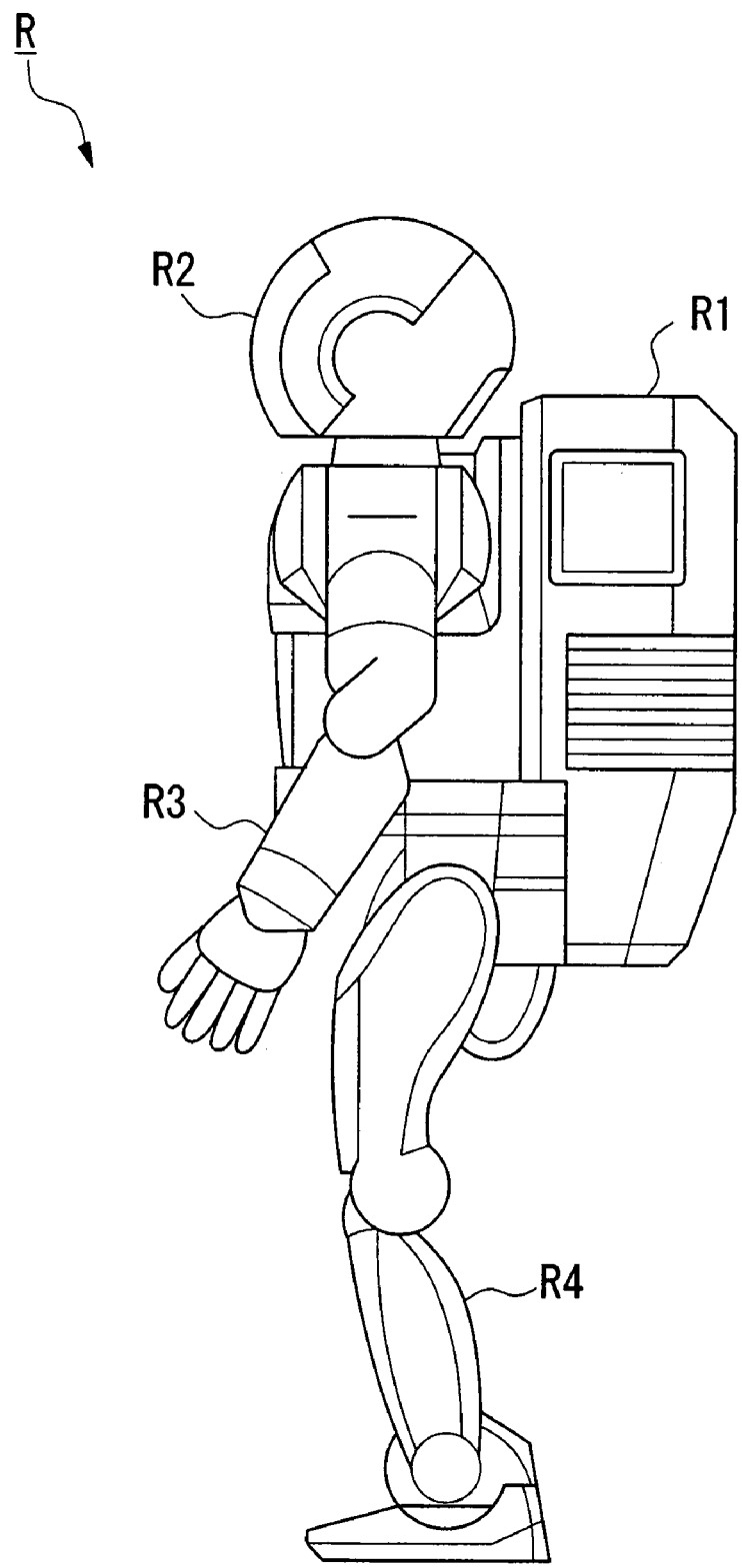
FIG. 14 is an explanatory diagram showing the external appearance of an autonomous robot.

Now a simple explanation of the structure of this autonomous robot R will be provided. FIG. 14 is an explanatory diagram which shows the external appearance of a human type autonomous robot R which walks upon two legs. In this figure, the reference symbol R1 denotes a control device mounting section upon which the pointing position detection section 2, the response processing section 5, and the behavior control section 6 are mounted. The reference symbol R2 denotes a head portion which includes the camera 1, the microphone 3, and the speech recognition section 4. The reference symbol R3 denotes an arm section, and the reference symbol R4 denotes a leg section. The operation of the head portion R2, the arm section R3, and the leg section R4 is controlled by the behavior control section 6.

<First Pointing Position Detection Operation>

Next, the operation of the pointing position detection section 2 shown in FIG. 1 will be explained. First, referring to the flow chart of FIG. 2, a first pointing position detection operation will be explained. Initially, the pre-processing section 21 generates a distance image from two images which are obtained by the camera 1, and stores it internally. Next, the pre-processing section 21 performs extraction of edges and extraction of skin colored regions from a reference image from one of the two cameras 1 which is designated in advance as the reference camera, and stores the results of these extraction processes internally.

Next, the moving contour extraction section 22 performs extraction of the moving contours using a snake method, and extracts and outputs (in a step S1) these contours of the portions for which the probability is high that they represent portions of a human being. This snake method is distinguished by using a contour line model based upon moving closed curved lines (so called "snakes"), and has the characteristic that it is able to extract the shape of an object even if the shape of the object in the image is changing over time. This snake method sets up an energy function depending upon the position and the shape of the snakes, such that the energy is at a minimum when the shape of the object and the shapes of the snakes are in agreement with one another. In concrete terms, it is defined as the sum of an internal energy due to the smoothness of the curve, an energy due to the discrepancies between the curve and the contour of the object, an energy due to external constraint forces, and the like. By thus performing adjustment by moving the position and the shape of the snake until the energy for the contour of the object in the image arrives at a local minimum value, it becomes possible to handle the problem of extracting the shape of the contour as an optimization problem of energy minimization. By doing this, it is possible to obtain the regions in the image for which the probability that they represent portions of a human being is high.

Figure 9A:
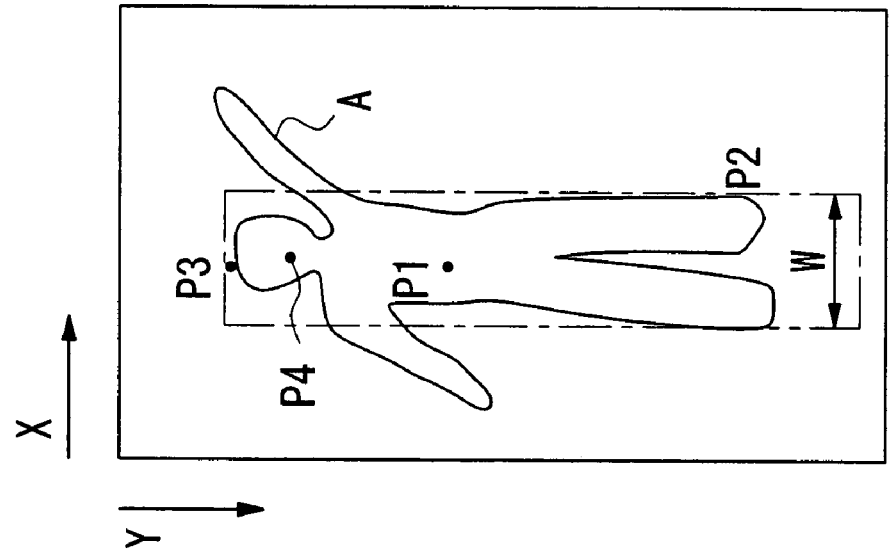
FIGS. 9A and 9B are explanatory diagrams showing the operation of the pointing position detection section 2 shown in FIG. 1.

Next (in a step S2), based upon the output of the moving contour extraction section 22, the head position extraction section 23 extracts a head position. Here, this operation of extraction of a head position will be explained with reference to FIGS. 3 and 9A. In FIG. 9A, the reference symbol A denotes the moving contour which is outputted by the moving contour extraction section 22. First (in a step S6), the center of gravity (see P1) of the region which is surrounded by this moving contour A is obtained, and next (in a step S7) the average distance within this contour is obtained by referring to the distance image. Next (in a step S8), a head position search region is set. This is done by obtaining each of the x coordinate values which are derived by adding and subtracting ½ of the average breadth W of human's shoulders (which has been determined in advance) to the x coordinate of the contour center of gravity, and by obtaining the vertical lines (denoted by the reference symbols VR and VL) which pass through these two x coordinate values (see P2). In addition, the region which is sandwiched between these two vertical lines is taken as the search region. Next (in a step S9), the highest point in this search region is taken as the head position (see P3). The coordinates of this head position are transmitted to the pointing direction calculation section 27 and to the face position extraction section 24.

Figure 4:
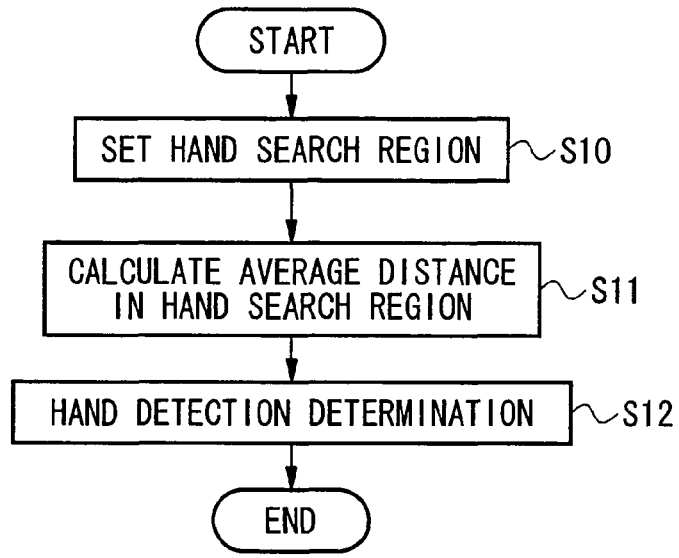
FIG. 4 is yet another flow chart showing the operation of the pointing position detection section 2 shown in FIG. 1.

Next (in a step S3), the hand position extraction section 25 extracts a hand position from within the contour which has been extracted by the moving contour extraction section 22. Here, this operation of extraction of a hand position will be explained with reference to FIG. 4. In a step S10, the hand position extraction section 25 sets a hand search region based upon the head position coordinates and upon the attained ranges of the left and right hands. Next (in a step S11), the hand position extraction section 25 obtains the average distance in the contour which has been extracted by the moving contour extraction section 22 which is present within the hand search region which has just been set. In addition (in the step S12), if the average distance which has been obtained here falls within the range from (the average distance within the entire moving contour −α) to (the average distance within the entire moving contour +α), the hand position extraction section 25 determines that this contour shall be taken as the contour of a hand. Here, α is set to about 90 cm, as a standard length for the arm of a human being. The coordinates of the hand position which has been extracted here are transmitted to the hand tip position extraction section 26.

Next (in a step S4), the pointing direction calculation section 27 performs determination of pointing direction, based upon the head position, the face position, and the hand tip position which have been respectively transmitted from the head position extraction section 23, the face position extraction section 24, and the hand tip position extraction section 26.

Figure 10:
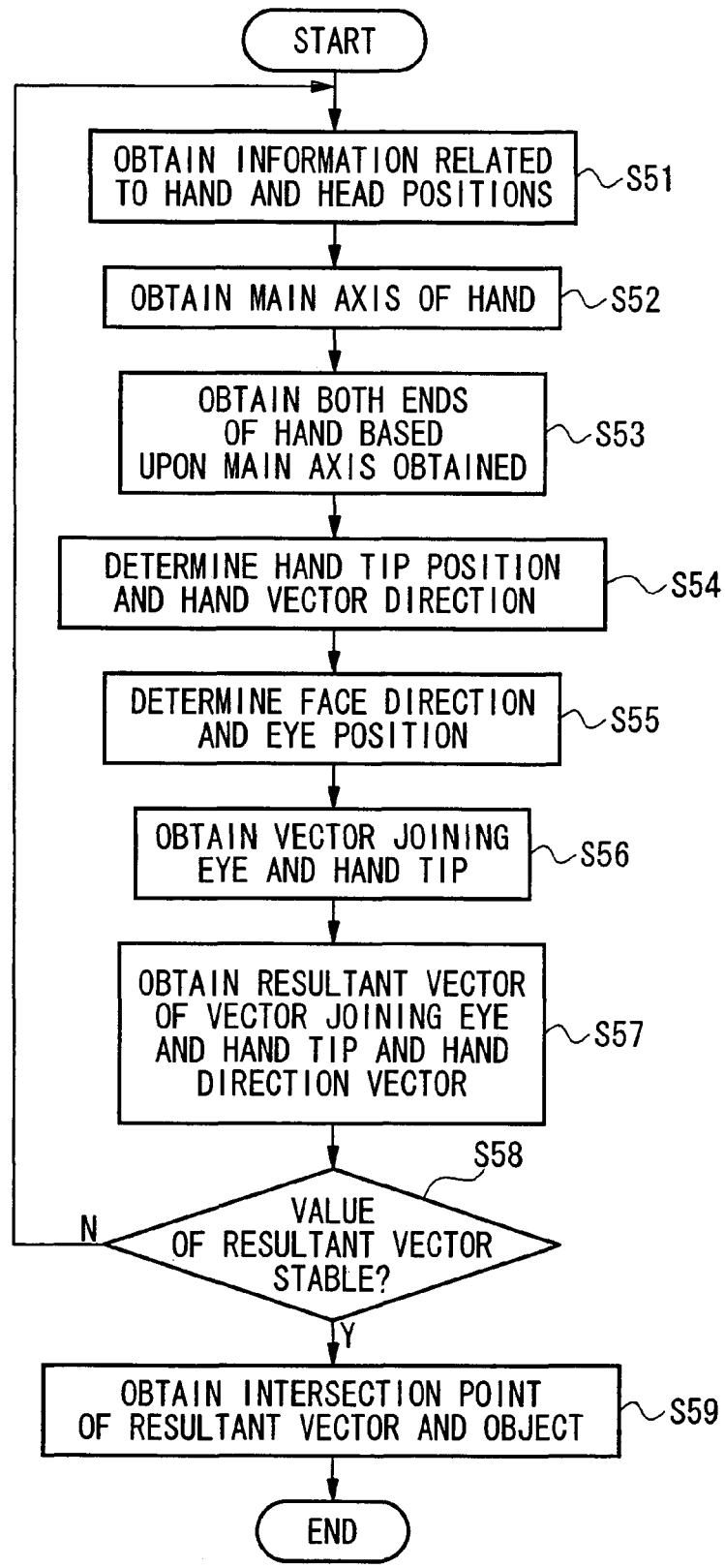
FIG. 10 is a flow chart showing the operation of calculation of pointing direction.

Here, the operation of detection of the position at which the human being is pointing by performing determination of pointing direction, based upon the head position, the face position, and the hand tip position which have been respectively transmitted in the step S4 from the head position extraction section 23, the face position extraction section 24, and the hand tip position extraction section 26, will be explained with reference to FIGS. 10 through 13. FIG. 10 is a flow chart showing the operation of the pointing direction calculation section 27 (including portions of the operation of the face position extraction section 24 and of the operation of the hand tip position extraction section 26). In addition, FIGS. 11A through 11E, 12, and 13 are explanatory diagrams showing this pointing direction calculation operation.

First (in a step S51), the face position extraction section 24 obtains the head position information for the human being who is making an indication from the head position extraction section 23. Furthermore (also in this step S51), the hand tip position extraction section 26 obtains the hand position information of the human who is making an indication. By information here is meant the coordinate values for the head position, the coordinate values for the central portion of the face, the area of the skin colored region of the face portion and the area of the black colored region of the hair portion, and the coordinate values for the hand position.

Next, the hand tip position extraction section 26 takes the coordinate values Parm (see FIG. 11A) of the hand position which has been obtained as being a central point, and sets a search circle. The diameter of this search circle is set so as to be smaller than the length of the arm of a typical human and so as to be larger than the length of his hand (his fist). For example, the radius may be set in advance to be 12 cm, and the size of the search circle upon the image may be determined based upon the coordinate values Parm of the hand position, and in consideration of the distance from the camera 1, and may be set upon the two dimensional image (see FIG. 11B). Next, the finger position extraction section 26 extracts the picture elements representing the hand of the human which are present within the search circle. The coordinate values of each of the picture elements in three-dimensional space are obtained by this extraction procedure. In addition (in a step S52), the pointing direction calculation section 27 determines a straight line (shown in FIG. 11C by the reference symbol L) along the direction in which the hand is pointing by an eigenvalue analysis method of principal component analysis or by regression calculation or the like, using the plurality of three dimensional coordinate values which have been obtained. In the following, this straight line will be termed the main axis of the hand. This straight line is a straight line in three-dimensional space.

Next (in a step S53), the hand tip position extraction section 26 obtains two ends (denoted in FIG. 11D by the reference symbols E1 and E2) of the hand present within the search circle from the main axis which has been obtained and from the coordinate values of the picture elements making up the hand present within the search circle.

Figure 11A:
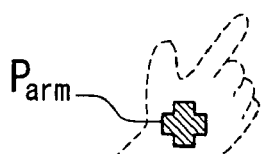
FIGS. 11A through 11E are explanatory drawings showing an operation of calculation of hand tip position.
Figure 11B:
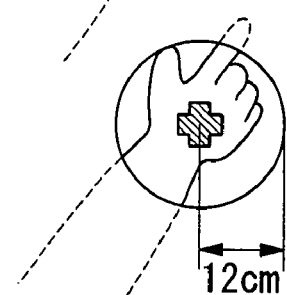
Figure 11C:
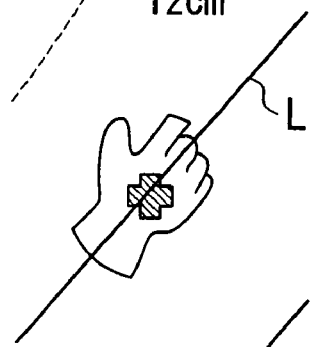
Figure 11D:
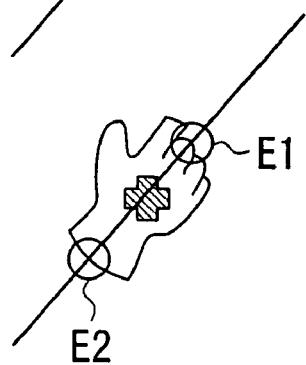
Figure 11E:
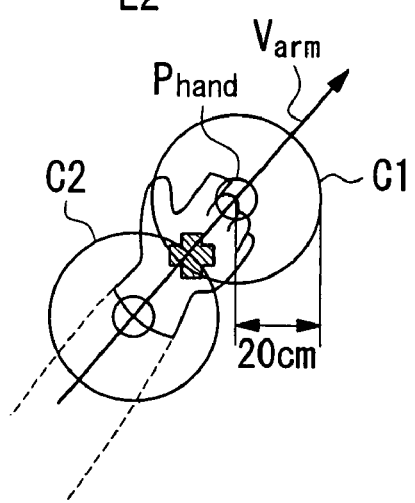
Figure 12:
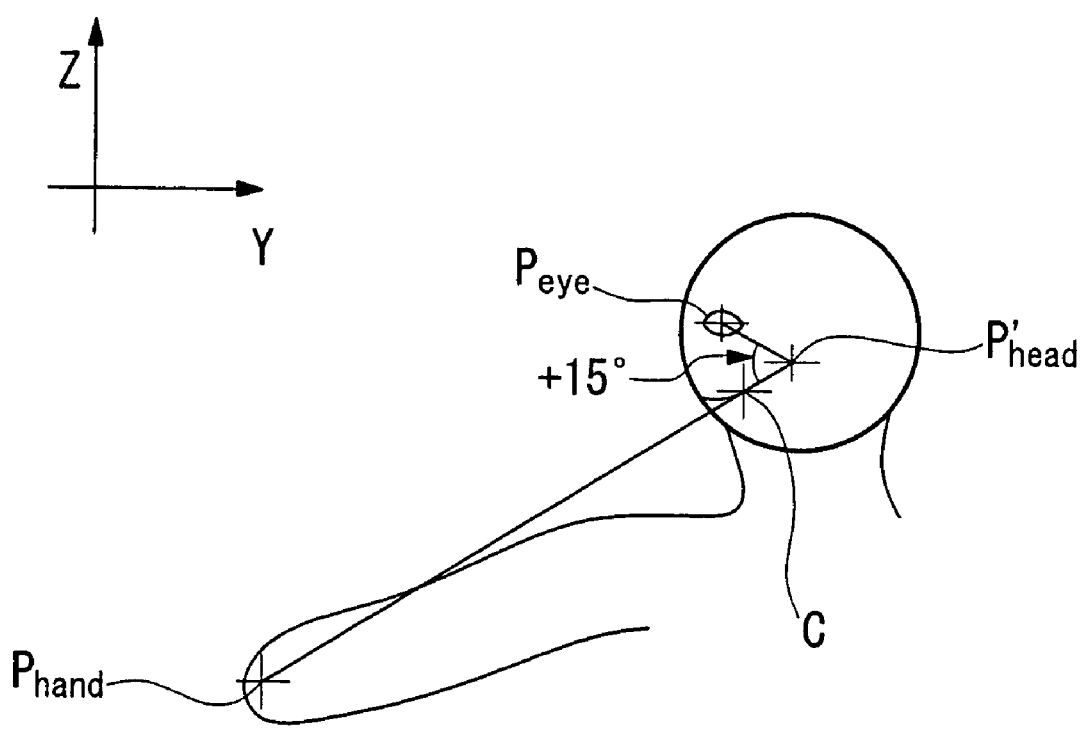
FIG. 12 is an explanatory diagram showing an operation of calculation of pointing direction.
Figure 13:
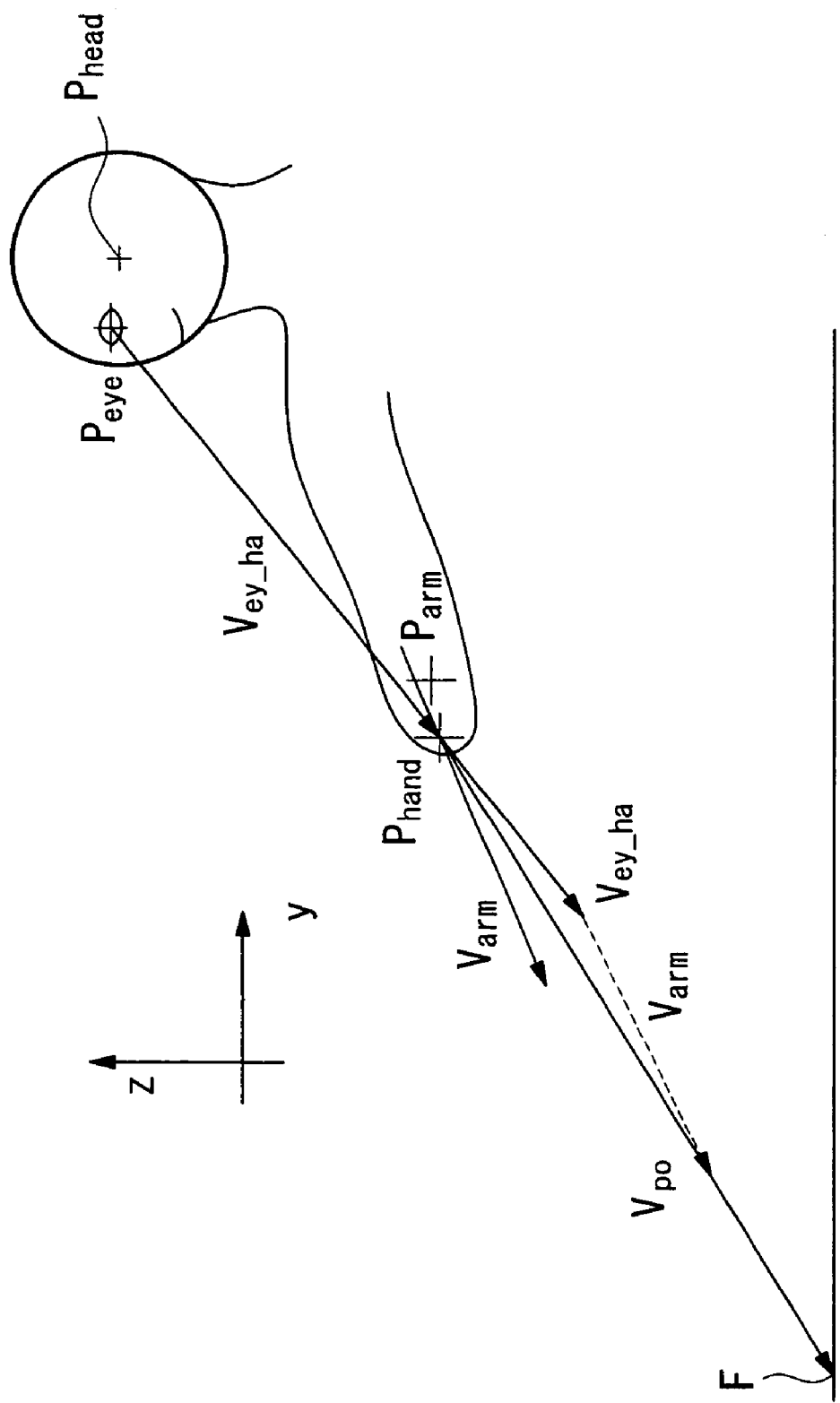
FIG. 13 is another explanatory diagram showing the operation of calculation of pointing direction.

Next (in a step S54), from among these two ends of the hand present within the search circle which have just been obtained, the hand tip position extraction section 26 determines which is the tip end of the hand, and obtains the hand tip position Phand and the direction vector Varm of the hand (see FIG. 11E). The decision as to whether or not a hand end is the tip portion of the hand is made by setting search circles of radius of 20 cm, corresponding to the length of the palm, at both the ends which have been obtained, and by determining whether or not picture elements which correspond to the hand portion are present within these two search circles. In the example shown in FIG. 11E, only portions of the hand which have been extracted in the search circle of FIG. 11B are present within the search circle C1, but, by contrast, within the search circle C2, portions of the arm other than the portions of the hand which have been extracted in the search circle of FIG. 11B are present, and accordingly it is possible to determine that the end point E1 on the side of the search circle C1 is the hand tip.

By the operation up to this point, the hand tip position and the direction vector of the hand of the human being who is making an indication have come to be determined, and the result obtained here is outputted to the pointing direction calculation section 27.

Next (in a step S55), the face position extraction section 24 obtains the direction of the face of the human being by comparing the area of the skin colored region of his face portion and the area of the black colored hair portion, and also determines the position of his eye. The position of the eye is obtained in the following manner. First, 8 cm is added to only the x component coordinate value (the direction viewed from the camera 1) of the central face portion coordinate value Phead (refer to FIG. 13), and the coordinate value P'head which has been obtained (refer to FIG. 12) is taken as a center and a spherical surface is defined and is taken as a virtual head. And a vertical plane with respect to the x axis is defined which has the x coordinate value of the intersection C of the line segment which joins the coordinate P' head of the center of this spherical surface and the hand tip position coordinate Phand which has been previously obtained and the spherical surface which is the virtual head, and, taking this intersection C as a standard, a position which is rotated clockwise by +15° around the center of the spherical surface in the y-z plane is taken as the position Peye of the eye (refer to FIG. 12). This position Peye of the eye is outputted to the pointing direction calculation section 27.

Next (in a step S56), the pointing direction calculation section 27 obtains the vector Vey_ha which connects the position Peye of the eye and the hand tip position Phand. Next (in a step S57), according to Equation (1), the pointing direction calculation section 27 obtains the resultant vector Vpo by normalizing the vector Vey_ha which connects the position Peye of the eye and the hand tip position Phand, and the direction vector Varm of the hand.

$$V_{po} = \left[ \frac{V_{ey\_ha}}{|V_{ey\_ha}|} + \frac{V_{arm}}{|V_{arm}|} \right] \quad (1)$$

Next, the pointing direction calculation section 27 obtains an average vector from the Varm and Parm which have been obtained from the 6 or more directly precedent frames, again obtains an average vector from these by excluding the two thereof for which the angular deviation from the former average vector is the maximum and the minimum, makes a decision (in a step S58) as to whether or not the condition that the angular deviation from the latter average vector is within a predetermined value (for example ±10) has held for four frames or more, and repeats the above procedure until this condition is satisfied.

Finally (in a step S59), the pointing direction calculation section 27 obtains the intersection of the resultant vector Vpo, elongated, and an object. This intersection corresponds to the position at which the human being who is making an indication is pointing. At this time, if the object is taken as being the floor, the height of the floor may be obtained based upon the feet of the human being who has made the indication; or, the height of the floor may be obtained based upon the position of the camera 1, the pan angle, and the tilt angle, it is possible to obtain the intersection F of the resultant vector Vpo and the floor by arithmetic calculation (see FIG. 13).

<Second Pointing Position Detection Operation>

Figure 5:
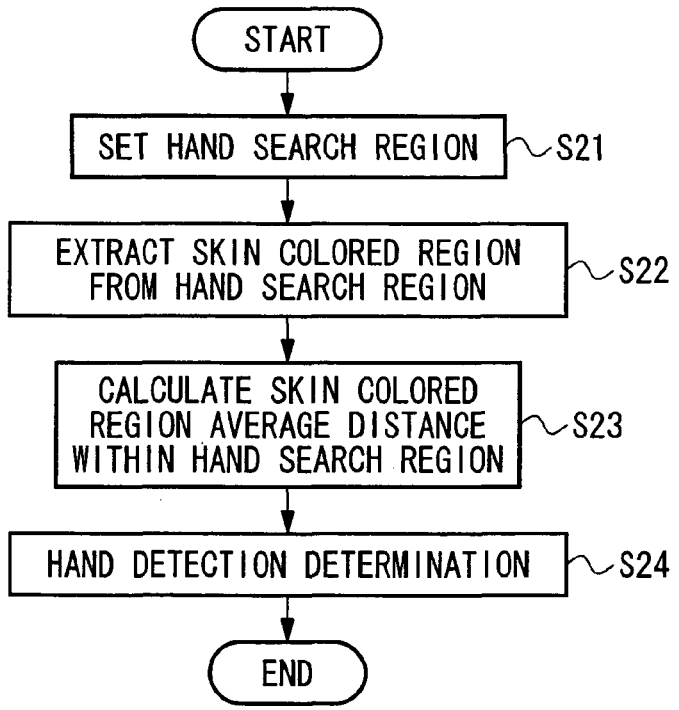
FIG. 5 is still yet another flow chart showing the operation of the pointing position detection section 2 shown in FIG. 1.

Next, a second pointing position detection operation will be explained with reference to FIG. 5. FIG. 5 is a flow chart showing the operation of hand position extraction (the step S3) shown in FIG. 2, and corresponds to the hand position extraction operation in the first pointing position detection operation shown in FIG. 4.

First (in a step S21), the hand position extraction section 25 sets a search region for the hand, based upon the head position coordinates and upon the attained range for the left and right hands. Next (in a step S22), the hand position extraction section 25 extracts a skin colored region within the moving contour, based upon the skin colored region and upon the moving contour which were obtained by the pre-processing procedure. Next (in a step S23), the hand position extraction section 25 obtains the average distance of the skin colored region which has been thus obtained, by referring to the distance image. In addition (in a step S24), if the average distance which has thus been obtained is within the range from (the average distance within the entire moving contour $-\alpha$) to (the average distance within the entire moving contour $+\alpha$), the hand position extraction section 25 determines to take this contour as the contour of the hand. Here $\alpha$ is set to about 90 cm, as a standard for the length of the arm of a human being. The coordinate of the hand position which has thus been extracted is transmitted to the pointing direction calculation section 27.

In this second pointing position detection operation, apart from the hand position extraction operation shown in FIG. 5, the operation is the same as in the first pointing position detection operation described above.

<Third Pointing Position Detection Operation>

Figure 6:
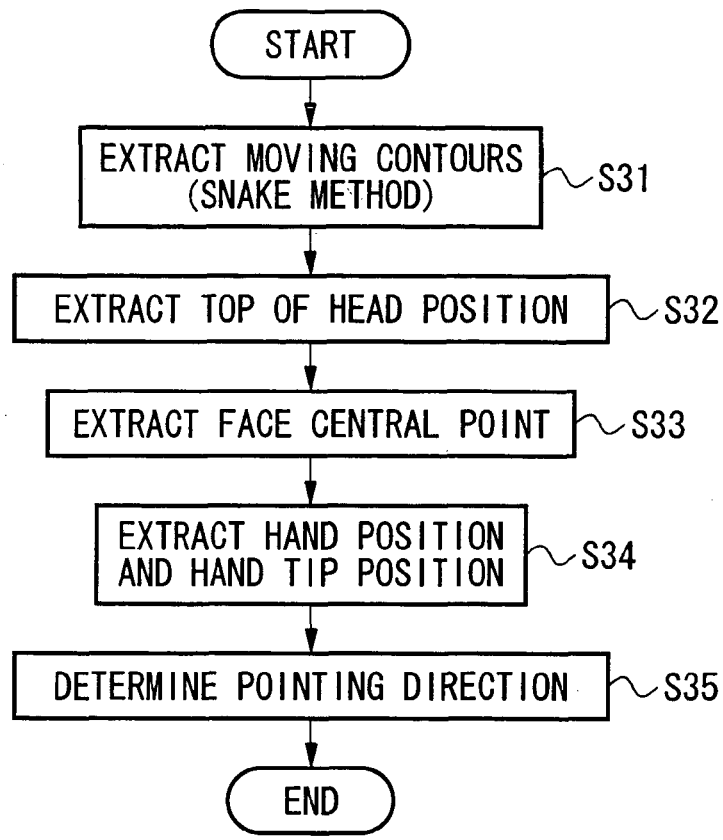
FIG. 6 is a further flow chart showing the operation of the pointing position detection section 2 shown in FIG. 1.
Figure 7:
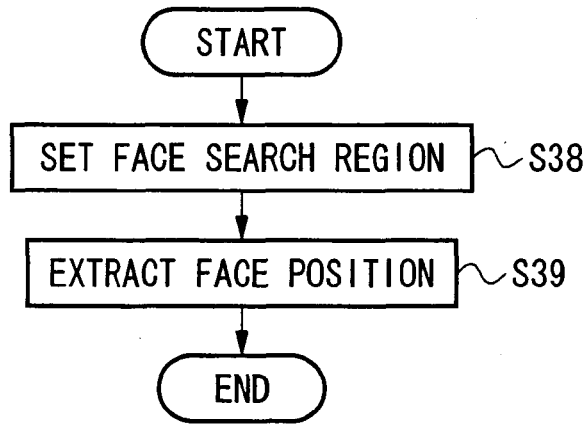
FIG. 7 is a yet further flow chart showing the operation of the pointing position detection section 2 shown in FIG. 1.
Figure 8:
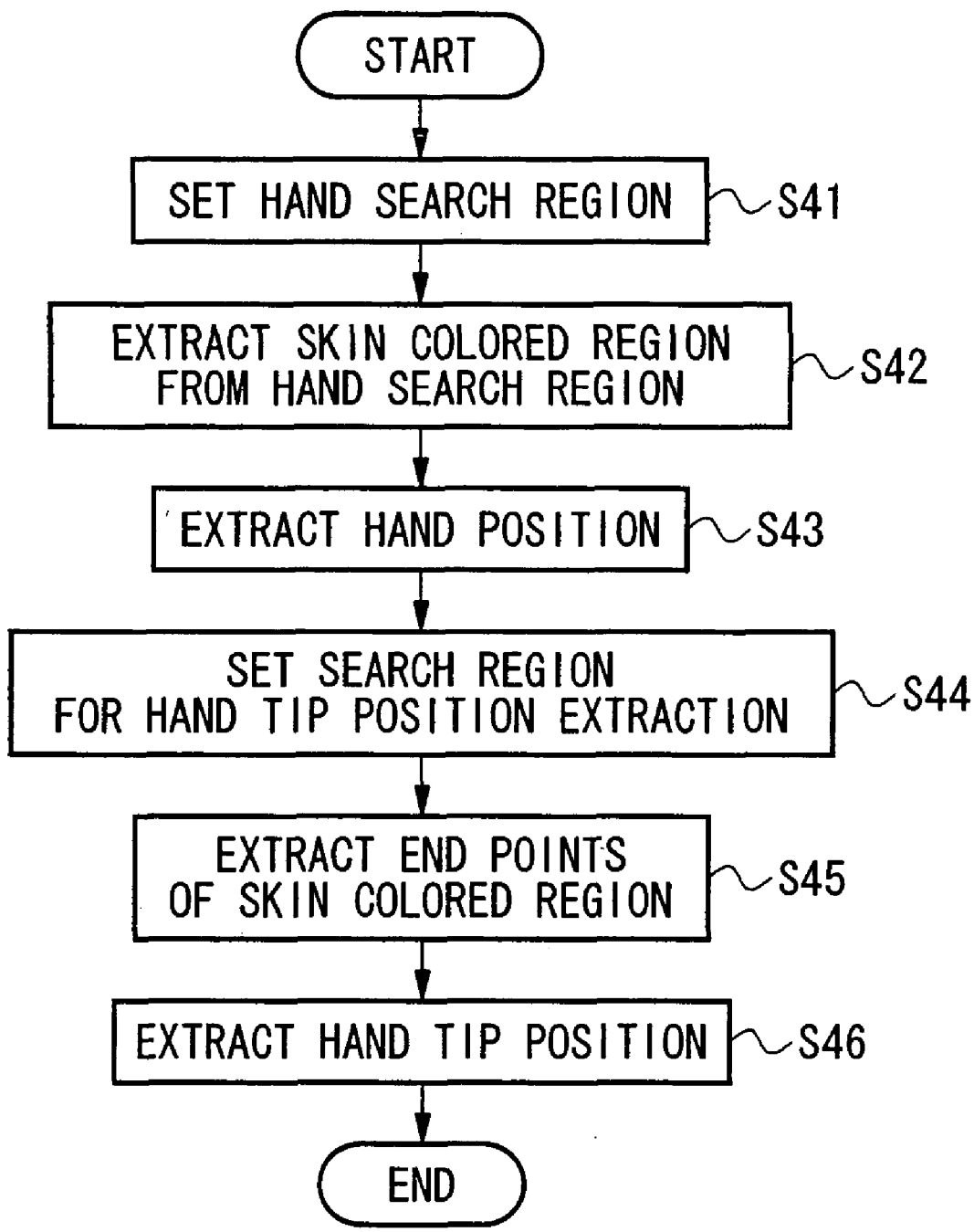
FIG. 8 is a still yet further flow chart showing the operation of the pointing position detection section 2 shown in FIG. 1.

Next, a third pointing position detection operation will be explained with reference to FIGS. 6, 7, and 8. First, the pre-processing section 21 generates a distance image from the two images which are obtained from the camera 1, and stores this image internally. Next the pre-processing section 21 performs edge extraction and skin colored region extraction from the reference image from one of the two cameras 1 which has been designated in advance as a reference camera, and stores the result of this extraction internally. And next the moving contour extraction section 22 performs extraction of the moving contours using a snake method, and extracts and outputs (in a step S31) these contours of the portions for which the probability is high that they represent portions of a human being.

Next (in a step S32), based upon the output of the moving contour extraction section 22, the head position extraction section 23 extracts a head position. Since this operation of extraction of a head position is the same as the one which has been explained with reference to the first pointing position detection operation, the details thereof will be curtailed. The coordinates of this head position which have thus been extracted are transmitted to the face position extraction section 24, to the pointing direction calculation section 27, and to the hand position extraction section 25.

Figure 9B:
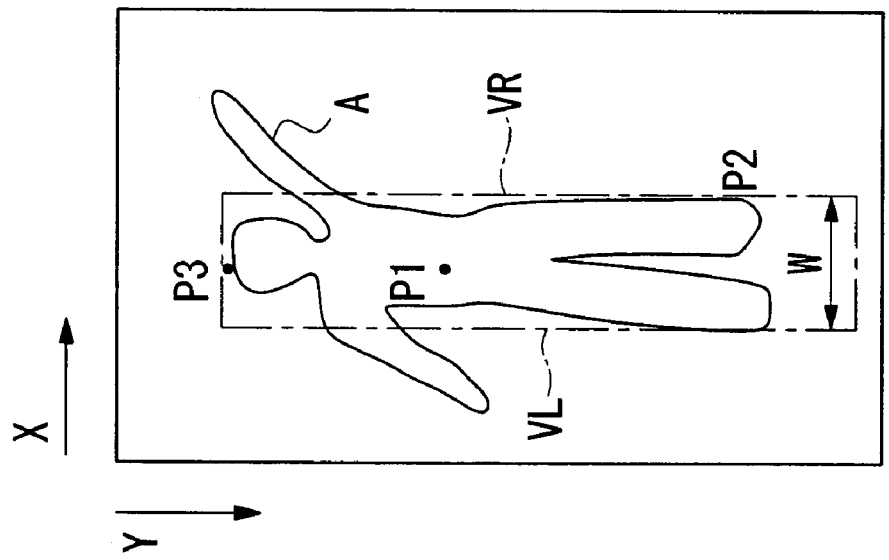

Next (in a step S33), the face position extraction section 24 extracts the central point of the face of a human being. This operation of extraction of the central portion of a human face will now be explained with reference to FIGS. 7 and 9B. First (in a step S38), the face position extraction section 24 sets a face search region. This face search region is set by referring to the coordinates of the head position which were previously obtained, and by theoretically defining a space region based upon a size of a predetermined standard face in which the position of the upper extremity is regarded as a head position. Next (in a step S39), the face position extraction section 24 extracts the skin colored region within the face search region which was previously set, and extracts the central point of this skin colored region as the face position. By doing this, the face position (see P4) shown in FIG. 9B comes to be extracted.

Next (in a step S34), the hand position extraction section 25 and the hand tip position extraction section 26 extract, respectively, a hand position and a hand tip position (the hand tip is taken as being the portion of the hand which extends outwards from the wrist). This hand position extraction operation and this hand tip position extraction operation will now be explained with reference to FIG. 8. The hand position extraction section 25 sets (in a step S41) a hand search region, based upon the head position coordinates and upon the attained range for the left and right hands. Next (in a step S42), the hand position extraction section 25 extracts a skin colored region within the moving contour, based upon the skin colored region and upon the moving contour which were obtained by the pre-processing procedure. Next, the hand position extraction section 25 refers to the distance image and obtains the average distance of the skin colored region which has thus been obtained. In addition (in a step S43), if the average distance which has thus been obtained is within the range from (the average distance within the entire moving contour $-\alpha$) to (the average distance within the entire moving contour $+\alpha$), the hand position extraction section 25 determines to take this contour as the contour of the hand. Here $\alpha$ is set to about 90 cm, as a standard for the length of the arm of a human being.

Next (in a step S44), the hand tip position extraction section 26 sets a search range for hand tip position extraction by taking the center of the contour which was regarded in the step S43 as that of the hand as a reference. This search range is set by referring to the distance image, and by inferring the length of the arm of a human being. Next (in a step S45), the hand tip position extraction section 26 extracts the upper, lower, leftmost, and rightmost end points of the contour of the skin colored region within the search range for hand tip position extraction. In addition (in a final step S46), the hand tip position extraction section 26 extracts the one among these end points which is furthest from the center of the face as being the hand tip position. The coordinates of this hand tip position are transmitted to the pointing direction calculation section 27.

Next (in a step S35), the pointing direction calculation section 27 determines the pointing direction based upon the head position, the face position, and the hand tip position coordinates which have been transmitted. Since this operation of determining the pointing direction is the same as the one which has been previously described, explanation thereof will be curtailed.

Since, in this manner, along with applying moving contour extraction to the extraction of a human being, which constitutes the object for performance of pointing position detection, also it is arranged to refer to the distance image at the same time, thereby, along with it becoming possible to perform reliable pointing position detection even if a plurality of human beings are present in the visual field, since it is arranged to detect characteristic points of a human being such as a face and a hand from the extracted contour information and to detect the position at which the human being is pointing from the positional relationship of these characteristic points, accordingly it is possible to implement a detection of the pointing position at high reliability, and which, moreover, as a high speed procedure. Furthermore, since it is possible to perform an accurate pointing of a position upon the surface of the floor or the like, it becomes easy to make an indication to an autonomous robot of a destination to which the robot should move, or to make an indication for commanding the robot to pick up some object which has fallen to the floor.

It should be understood that it would also be possible to record a program for implementing the functions of each of the processing sections of FIG. 1 upon a recording medium which could be read in by a computer, and to perform pointing position detection processing and response processing by reading this program on this recording medium into a computer system and executing it. In addition, it should be understood that, here, the term "computer system" includes an OS and hardware such as peripheral devices and the like. Furthermore, in the event that the WWW system is employed, the term "computer system" also includes a home page provision environment (or a home page display environment). Yet further, by "a recording medium which can be read in by a computer" is meant a transportable medium such as a flexible disk, a magneto-optical disk, a ROM, a CD-ROM, or the like, as well as a storage device such as a hard disk or the like which is internal to a computer system. Even further, the term "recording medium which can be read in by a computer" also includes a medium which temporarily holds a program such as a volatile memory (RAM) internal to a computer system which constitutes a server or a client when the program has been transmitted via a network such as the internet or the like, or via a transmission line such as a telephone line or the like.

Furthermore, the above-described program may be transmitted from a computer system upon which this program is stored in a storage device or the like to another computer system via a transmission medium or by a transmission wave in a transmission medium. Here, by "transmission medium" which transmits the program is meant a medium which is endowed with a function of transmitting information, such as a network such as the internet or the like, or a transmission line such as a telephone line or the like. Furthermore, the above-described program may also be one for implementing a portion of the above-described function. Yet further, it may be one which can implement the above described function in combination with a program which is already recorded upon a computer system, in other words a so called incremental file (an incremental program).

What is claimed is:

1. A pointing position detection device which detects the presence of a human being from an image which is photographed by a plurality of cameras, and which detects a position at which the human being is pointing, comprising:
    a section which detects a head position of the human being, including at least distance information, based upon the image;
    a section which detects a hand position of the human being, including at least distance information, based upon the image;
    a section which calculates a position of a hand tip and a main axis of the hand, based upon the hand position which has been detected; and
    a section which detects a direction in which the human being is pointing, based upon the head position which has been detected and the position of the hand tip and the main axis of the hand which have been calculated,
    wherein the position at which the human being is pointing is detected, based upon the detected direction in which the human being is pointing, and
    wherein the position at which the human being is pointing is detected by calculating the intersection of the direction in which the human being is pointing and a predetermined object which is present within the image.

2. A pointing position detection device which detects the presence of a human being from an image which is photographed by a plurality of cameras, and which detects a position at which the human being is pointing, comprising:
    a section which detects a head position of the human being, including at least distance information, based upon the image;
    a section which detects a hand position of the human being, including at least distance in formation, based upon the image;
    a section which calculates a position of a hand tip and a main axis of the hand, based upon the hand position which has been detected;
    a section which detects a direction in which the human being is pointing, based upon the head position which has been detected and the position of the hand tip and the main axis of the hand which have been calculated; and
    a section which calculates a position of an eye, based upon the head position which has been detected,
    wherein the section for detecting the direction in which the human being is pointing detects the direction in which the human being is pointing, based upon the position of the eye, the position of the hand tip, and the main axis of the hand,
    wherein the position at which the human being is pointing is detected, based upon the detected direction in which the human being is pointing, and
    wherein the position at which the human being is pointing is detected by calculating the intersection of the direction in which the human being is pointing and a predetermined object which is present within the image.

3. A pointing position detection device which detects the presence of a human being from an image which is photographed by a plurality of cameras, and which detects a position at which the human being is pointing, comprising:
    a section which detects a head position of the human being, including at least distance information, based upon the image;
    a section which detects a hand position of the human being, including at least distance information, based upon the image;
    a section which calculates a position of a hand tip and a main axis of the hand, based upon the hand position which has been detected; and
    a section which detects a direction in which the human being is pointing, based upon the head position which has been detected and the position of the hand tip and the main axis of the hand which have been calculated,
    wherein the position at which the human being is pointing is detected, based upon the detected direction in which the human being is pointing,
    wherein the section for detecting the hand position further comprises a section which sets a predetermined search region within the image, based upon the position of the head, and
    wherein the position at which the human being is pointing is detected by calculating the intersection of the direction in which the human being is pointing and a predetermined object which is present within the image.

4. An autonomous robot comprising a pointing position detection device which detects the presence of a human being from an image which is photographed a plurality of cameras, and which detects a position at which the human being is pointing, comprising:
- a section which detects a head position of the human being, including at least distance in formation, based upon the image;
- a section which detects a hand position of the human being, including at least distance information, based upon the image;
- a section which calculates a position of a hand tip and a main axis of the hand, based upon the hand position which has been detected; and
- a section which detects a direction in which the human being is pointing, based upon the head position which has been detected and the position of the hand tip and the main axis of the hand which have been calculated,
- wherein the position at which the human being is pointing is detected, based upon the detected direction in which the human being is pointing, and
- wherein the position at which the human being is pointing is detected by calculating the intersection of the direction in which the human being is pointing and a predetermined object which is present within the image.

5. An autonomous robot comprising a pointing position detection device which detects the presence of a human being from an image which is photographed by a plurality of cameras, and which detects a position at which the human being is pointing, comprising:
- a section which detects a head position of the human being, including at least distance information, based upon the image;
- a section which detects a hand position of the human being, including at least distance information, based upon the image;
- a section which calculates a position of a hand tip and a main axis of the hand, based upon the hand position which has been detected;
- a section which detects a direction in which the human being is pointing, based upon the head position which has been detected and the position of the hand tip and the main axis of the hand which have been calculated; and
- a section which calculates a position of an eye, based upon the head position which has been detected,
- wherein the section for detecting the direction in which the human being is pointing detects the direction in which the human being is pointing, based upon the position of the eye, the position of the hand tip, and the main axis of the hand,
- wherein the position at which the human being is pointing is detected, based upon the detected direction in which the human being is pointing, and
- wherein the position at which the human being is pointing is detected by calculating the intersection of the direction in which the human being is pointing and a predetermined object which is present within the image.

6. An autonomous robot comprising a pointing position detection device which detects the presence of a human being from an image which is photographed by a plurality of cameras, and which detects a position at which the human being is pointing, comprising:
- a section which detects a head position of the human being, including at least distance information, based upon the image;
- a section which detects a hand position of the human being, including at least distance information, based upon the image;
- a section which calculates a position of a hand tip and a main axis of the hand, based upon the hand position which has been detected; and
- a section which detects a direction in which the human being is pointing, based upon the head position which has been detected and the position of the hand tip and the main axis of the hand which have been calculated,
- wherein the position at which the human being is pointing is detected, based upon the detected direction in which the human being is pointing,
- wherein the section for detecting the hand position further comprises a section which sets a predetermined search region within the image, based upon the position of the head, and
- wherein the position at which the human being is pointing is detected by calculating the intersection of the direction in which the human being is pointing and a predetermined object which is present within the image.

7. A pointing position detection device as described in claim 3, wherein the main axis of the hand is detected, based upon the distribution of picture element data which make up the image of the hand present within the search region.

8. An autonomous robot as described in claim 6, wherein the main axis of the hand is detected, based upon the distribution of picture element data which make up the image of the hand present within the search region.

* * * * *

UNITED STATES PATENT AND TRADEMARK OFFICE
CERTIFICATE OF CORRECTION

PATENT NO. : 7,460,687 B2  
APPLICATION NO. : 10/616288  
DATED : December 2, 2008  
INVENTOR(S) : Taro Yokoyama It is certified that error appears in the above-identified patent and that said Letters Patent is hereby corrected as shown below:

Title Page, Item (54) & Col. 1, Line 1:

Please correct the title, which should read as:

--POINTING POSITION DETECTION DEVICE AND AUTONOMOUS ROBOT--

Title Page, Insert Item (30): Foreign Application Priority Date as follows:

--July 12, 2002    (JP)    2002-204048  
August 8, 2002    (JP)    2002-231899--

Signed and Sealed this

Twenty-eighth Day of April, 2009

JOHN DOLL  
*Acting Director of the United States Patent and Trademark Office*